United States Patent
Dubie et al.

(10) Patent No.: US 9,253,133 B2
(45) Date of Patent: Feb. 2, 2016

(54) MESSAGE THREAD IDENTIFICATION AND MANAGEMENT

(71) Applicant: Dropbox, Inc., San Francisco, CA (US)

(72) Inventors: Jack Dubie, Menlo Park, CA (US); Michael Roeder, Oakland, CA (US); Steven Kabbes, Mountain View, CA (US); Sean Beausoleil, Mountain View, CA (US)

(73) Assignee: DROPBOX, INC., San Francisco, CA (US)

( * ) Notice: Subject to any disclaimer, the term of this patent is extended or adjusted under 35 U.S.C. 154(b) by 20 days.

(21) Appl. No.: 14/084,984

(22) Filed: Nov. 20, 2013

(65) Prior Publication Data

US 2015/0113076 A1 Apr. 23, 2015

Related U.S. Application Data

(63) Continuation of application No. 14/059,321, filed on Oct. 21, 2013, now abandoned.

(51) Int. Cl.
*G06F 15/16* (2006.01)
*H04L 12/58* (2006.01)

(52) U.S. Cl.
CPC ............ *H04L 51/16* (2013.01); *H04L 12/586* (2013.01); *H04L 12/588* (2013.01); *H04L 12/589* (2013.01)

(58) Field of Classification Search
CPC .............................. H04L 12/586; H04L 15/16
USPC .................. 709/201, 202, 203, 204, 205, 206
See application file for complete search history.

(56) References Cited

U.S. PATENT DOCUMENTS

| | | | |
|---|---|---|---|
| 7,593,995 B1 | 9/2009 | He et al. | |
| 7,870,204 B2 | 1/2011 | LeVasseur et al. | |
| 2003/0101065 A1 | 5/2003 | Rohall et al. | |
| 2005/0289555 A1* | 12/2005 | Jiang ....................... | G06F 9/542 719/310 |
| 2006/0271630 A1* | 11/2006 | Bensky ................ | G06Q 10/107 709/206 |
| 2007/0143425 A1* | 6/2007 | Kieselbach ......... | G06F 17/2288 709/206 |
| 2010/0174784 A1* | 7/2010 | Levey ..................... | H04L 51/34 709/206 |
| 2011/0231499 A1* | 9/2011 | Stovicek ........... | H04M 1/72547 709/206 |
| 2013/0124548 A1* | 5/2013 | Chhaparia ......... | G06F 17/30424 707/758 |
| 2013/0238728 A1* | 9/2013 | Fleck ...................... | H04L 51/36 709/206 |
| 2013/0262593 A1* | 10/2013 | Srikrishna ........... | H04L 12/5885 709/206 |

* cited by examiner

*Primary Examiner* — Dhairya A Patel
(74) *Attorney, Agent, or Firm* — DLA Piper LLP (US)

(57) ABSTRACT

Systems and methods for identifying threads of related messages. A computer can associate messages with threads by storing a thread identifier (thread ID) identifying a thread and associating the thread ID with a message identifier (message ID) of each known message that belongs to the thread. The computer can inspect a message to determine whether the message identifies a reference message. Before assigning a thread ID to the message or a reference message, the computer can determine whether a message ID for either message is stored in association with a thread ID. If a thread ID is stored for a message ID of either message, the computer can assign the thread ID to message IDs of other reference messages. If a thread ID is not stored for a message ID of either message or is different for either message, store a common thread ID in association with both messages.

20 Claims, 10 Drawing Sheets

MESSAGE THREAD IDENTIFICATION AND MANAGEMENT

CROSS-REFERENCE TO RELATED APPLICATION

This application is a continuation of and claims priority from U.S. application Ser. No. 14/059,321, entitled "Message Thread Identification and Management," filed on Oct. 21, 2013, the disclosure of which is incorporated herein by reference.

BACKGROUND

The present disclosure relates generally to electronic messaging, and more specifically to identifying and managing information about related electronic messages.

Electronic messaging, or electronic message communication, generally refers to the communication of electronic messages from a sender to one or more recipients via a computing system. One widely used form of electronic message communication includes email. "A message" as used herein broadly refers to an electronic message (e.g., an email message) communicated via an electronic messaging system. Applications or client devices can communicate and access messages using a message service provider via a protocol such as a post office protocol (POP) or an Internet message access protocol (IMAP). Message service providers can include, for example, Google Mail®, Yahoo Mail®, Hotmail®, or other mail services. Messages, such as an email message, can include a header that can identify the message and that can identify other related messages. For example, a header in an email message can include a message identifier ("message ID") that represents a unique string which identifies the email message in a messaging system. The header can include a reply field (e.g., an "in-reply-to" field) that identifies a message ID of a predecessor (parent) email message that an email message including the message ID is in response, or reply to. A references field in the header can identify one or more message IDs for messages that are predecessors of a message.

Communication by email and other forms of electronic messaging has grown beyond a tool for corresponding to others to a tool for organizing and managing people's lives and businesses. Many people rely on messaging as a way to manage tasks. But as a seemingly ever-increasing amount of content is communicated over email, users struggle to manage the volume of messages that are received every day. Message services and client devices are also faced with the task of managing computing resources and access to the volume of messages. The increase in volume of messages challenges message service providers to find new ways to identify and associate messages into groups or threads to improve access and management of the messages. Client devices with reduced computing resources can be susceptible to machine crashes and unavailable, or limited computing resources to identify and store thread information.

SUMMARY

Certain embodiments of the present invention relate to techniques for identifying and managing threads of related messages. Messages can include email messages, text messages, or other types of messages used for electronic communication that can be related as a group.

It can be desirable for messages to be grouped into a thread of related messages. A "message thread" or a "thread" as used herein refers to a collection of messages with a shared predecessor or parent message. Applications (e.g., email applications) and services (e.g., email services) providing access to messages received from a message service provider may be unable to group messages. In circumstances when messages are received out of order based on creation or communication, or are provided at different times by a message service provider, applications and messaging services receiving the messages can encounter difficulty in determining whether messages that are being received are related to messages that have been received. Thus, there is a need for a new and useful system and method for identifying and managing threads of messages. This invention provides such a new and useful systems, methods, and apparatuses.

A data store can be useful to store information for identifying and managing relationships of messages that can be received out of order and/or at different times based on creation or communication from a message service provider. Besides a message identifier (message ID) that uniquely identifies a message, a header can include one or more references, each indicating a reference message ID of a reference message (e.g., a predecessor message, ancestor message, or parent message) that is related to the message. Messages and reference messages can be associated with a thread using a thread identifier (thread ID). A thread ID can be stored in association with a message ID of each known message that belongs to the thread. In this manner, a data store can maintain thread IDs for different messages to enable identification of messages that are common to a thread based on thread ID. The thread IDs stored in the data store can ensure that messages that have been identified as related are associated with a common thread. By associating thread IDs with messages, messages that are associated with a common thread can remain consistently threaded.

The techniques described herein for managing threads of messages can be performed by a message service (e.g., a message management service) that functions as an intermediary computing system to facilitate communication of messages between a client (e.g., a mobile phone or a tablet computing device) and a message service provider. For clients that can be limited by computing resources, the message service can communicate messages from the messages service provider to the clients using different delivery schemes. The message service can also provide the information about threads identified in the received messages to the clients to enable clients to effectively understand relationships between the messages. The thread information can enable clients to accurately group messages into folders and to enable messages applications to properly reference relationships of messages. The data store can also enable a message service to manage storage of messages such that duplication of messages can be avoided. In some embodiments, the information about message threads can be provided to message service providers, which can use information about the message threads to reduce storage otherwise used for thread management. Identified message threads can be useful for any service or device that desires to manage activity and actions with respect to messages.

An embodiment can be related to a method for managing message threads. The method can be performed by a processor of one or more server computers of a message service. The server computer can receive messages from one or more message service providers. Each received message can be processed to determine whether a data store coupled to the server computer stores a message ID of the message in association with a thread ID. Identification of a message ID indicates that the message is associated with a thread identified by the thread ID. Upon receiving a message to process, the server can inspect the message to determine whether the received message includes one or more reference messages identified by reference message IDs. A reference message ID can correspond to a message ID associated with a field (e.g., "in-reply-to" field or "references" field) in a header of the received message. A reference message can be a related message, such as a parent message or a predecessor (e.g., ancestor) reference message of a received message being processed. The server computer can determine whether each reference message ID is stored in the data store in association with a thread ID in the data store. Existence of a thread ID associated with a reference message ID can indicate that the reference message is identified with a thread.

To ensure that thread information is stored correctly to maintain consistency of threading, the server computer can use a data store to manage association of a thread ID with reference messages and received messages. In some embodiments, the server computer will assign a new thread ID to a message ID when the message does not indicate reference messages. In the event that reference messages are not associated with a thread and the received message is associated with a thread ID, each of the reference messages is assigned a thread ID associated of the received message. Each messages ID of a received message or a reference message that is assigned a thread ID can be stored in the data store. In some embodiments, the received message can be assigned the thread ID of a reference message. In some embodiments, when a message and a reference message have different thread IDs, the message can be assigned the thread ID of the reference message or the reference message can be assigned the thread ID of the message. By storing thread IDs for different messages, the server can identify messages that are common to a thread based on thread ID.

The following detailed description together with the accompanying drawings will provide a better understanding of the nature and advantages of the present invention.

DETAILED DESCRIPTION

Figure 1:
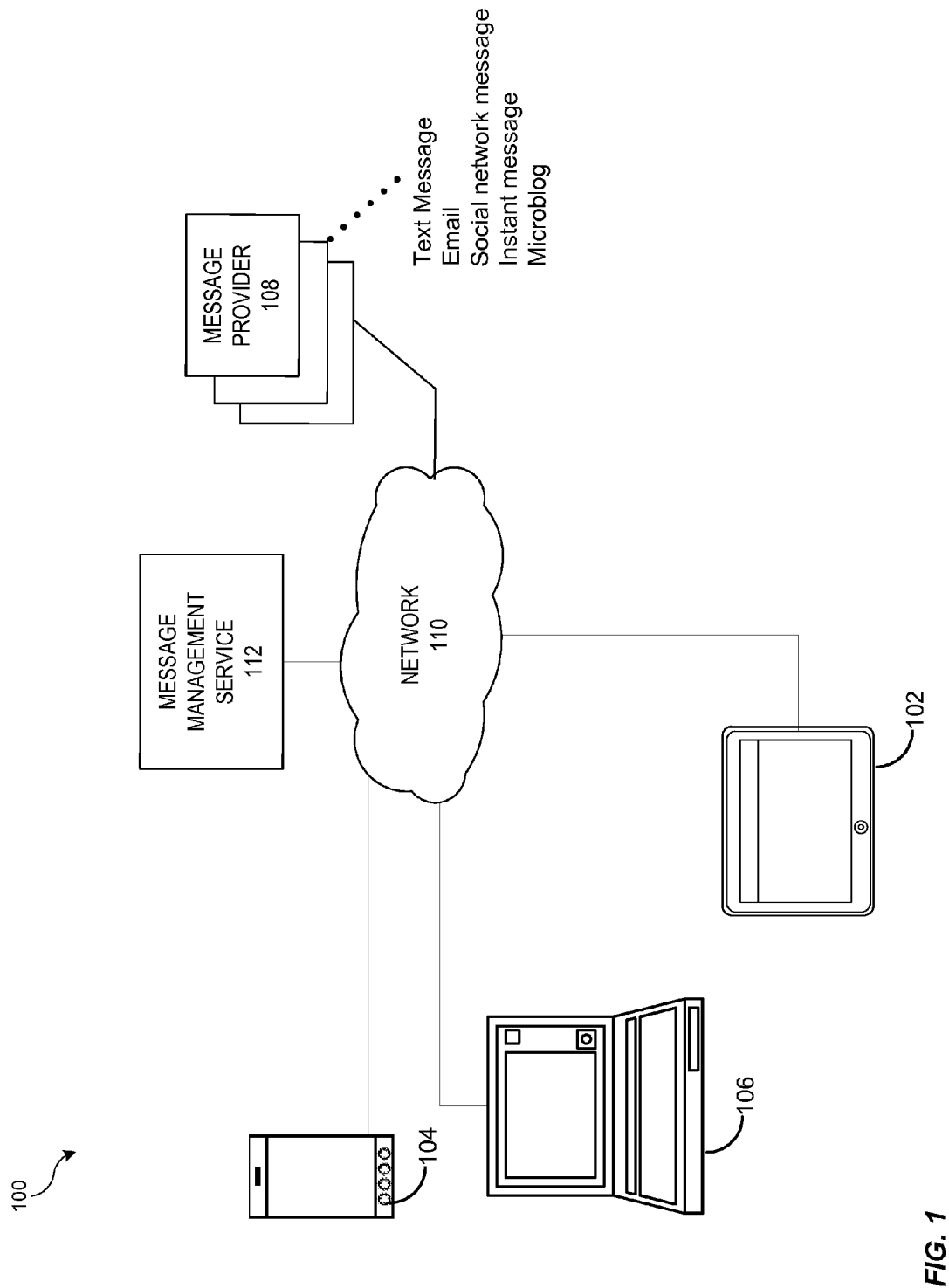
FIG. 1 is a block diagram of a system according to some embodiments of the present invention.

The following description of certain embodiments of the invention is not intended to limit the invention to these embodiments, but rather to enable any person skilled in the art to make and use this invention.

Certain embodiments of the present invention relate to techniques for identifying and managing threads of messages are related. Messages can include email messages, text messages, social media messages, micro-blogging messages, instant messages, or other types of electronic messages that can be related as a thread. Often, messages received by a client (e.g., a mobile phone or a table computing device) from a message service provider can be received out of order or at different times based on creation or constraints of communication and computing resources. Some embodiments are described herein of a message management service that manages threads of messages to facilitate and improve communication of messages between a client and a message service provider.

In certain embodiments, a data store can be maintained to store information indicating related messages. A data store can be implemented to store a thread identifier (thread ID) with a message identifier (message ID) of each known message that belongs to the thread. Upon receiving a message to process, the message can be processed to determine whether the data store already stores a message ID of the message in association with a thread ID. A message ID stored in the data store can indicate that the message is associated with a thread. The received message can be further inspected to determine whether the received message includes one or more reference messages identifiers of reference messages (reference message ID). A reference message ID can be a message ID associated within a specific field (e.g., "in-reply-to" field or "references" field) in a header of the received message. A reference message can be a parent message or a predecessor (e.g., ancestor) message of the received message being processed. The data store can be searched to determine whether each reference message ID is stored in the data store in association with a thread ID in the data store. Existence of a thread ID associated with a reference message ID can indicate that the reference message is already associated with a thread. Each of the reference messages identified in the received message can be related to the received message based on the thread ID.

To further illustrate, a new thread ID can be assigned to a message ID when the message does not have reference messages identifiers. If the message has one or more reference messages identifiers, before assigning a thread ID to the message and/or one or more reference messages, the server can search the data store to determine whether an identifier of the message or one or more reference messages are already stored in association with an thread ID. If one message out of the message and the reference messages has a thread ID, that thread ID is assigned to each of the other messages and reference messages. In some embodiments, if a thread ID of a message and a thread ID of one or more reference messages are different, then a common thread ID can be chosen for association with the message and the one or more reference messages. The common thread ID can be the thread ID of the message or can be assigned the thread ID associated with one of the reference messages. In certain embodiments in which thread IDs are different amongst reference messages, then a common thread ID can be chosen from one of the thread ID associated with one of the reference messages. The common thread ID can be stored in association with each of the reference messages and the message ID. By storing a thread ID with each message or reference message that is identified, a data store can accurately maintain information about related messages identifiable by a thread ID. The information about the threads can be provided to clients to enable clients to effectively understand relationships between messages. The information can enable clients to accurately group messages into folders and to enable messages applications to properly reference relationships of messages. Identified message threads can be useful for any service or device that desires to manage activity and actions with respect to messages.

FIG. 1 shows message management system 100 that can identify and manage information about threads of messages according to an embodiment of the present invention. Message management system 100 can includes client 102, client 104, client 106, network 110, message management service 112, and message provider 108. Client 102, client 104, client 106, message management service 112, and message provider 108 can communicate with each other via network 104. Network 104 can be, for example, the Internet, a mobile network, a wireless network, a cellular network, other communication networks, or a combination thereof.

As used herein "message provider" (e.g., a message service provider) refers generally to an entity having a computing infrastructure (e.g., one or more computer servers) that provides services to enable clients to send and receive messages, access messages, or perform one or more operations (e.g., edit, delete, modify, create, or manage) on messages. Message provider 108 can provide services that are accessible using a message access protocol, such as an Internet Message Access Protocol (IMAP). Message provider 180 can enable a client to create an account, such as a post office protocol (POP) account, which enables the client to control access to messages, to communicate messages, and perform other operations on messages. The account can enable clients to access messages stored in the computing infrastructure of message provider 108. The account can enable messages to be downloaded to the client. Message provider 108 is shown as one entity of multiple message providers 108 that can be included in message management system 100. A message provider 108 can include message service providers such as a SMSC (Short Message Service Center), a MMSC (Multimedia Message Service Center), an instant message service provider, a social network message provider, and a micro-blogging service provider, or an email service provider. Message provider 108 can include, for example, an email service to provide functions, such as sending email messages, receiving email messages, storing email messages, organizing email messages, and searching email messages, and so on. Examples of email service providers can include Google Mail®, Yahoo Mail®, or Hotmail®.

As used herein, a "client" refers generally to a combination of computer hardware and software that enables a user to receive one or more messages from message provider 108 and to interact with message management service 112. In the illustrated embodiment in FIG. 1, client 102 can be a mobile computing device, client 104 can be a personal computing device, and client 106 can be a tablet computing device. However, embodiments of the present invention are not limited to this illustrated embodiment as client devices 102, 104, 106 can take any suitable form convenient for use by a user. For example, client device 102 can be a personal digital assistant (PDA), a tablet computer, a laptop computer, a desktop computer, a wearable computer, a pager, etc. Client 102 can interact with message provider 108 to use one or more services provided by message provider 108 for an account of a user of client 102. For example, a user of a client, such as client 104, can use an email application (e.g., a mailbox application) for sending and receiving emails via message provider 108. Message management service 112 can communicate with message provider 108 to operate, on behalf of client 102, 104, 104 one or more services provided by message provider 108. For example, client 104 can communicate via message management service 112 to receive and send messages via message provider 108.

"Message management service" refers generally to a combination of computer hardware and software that can manage information about messages received from message provider 108. Message management service 112 can be a collection of servers, such as a distributed computing infrastructure, which operates to manage information about messages received from message provider 108. Message management service 112 can facilitate communication of messages between client 102, 104, 106 and message provider 108. Whereas, a message provider 108 provides access to messages for a message account (e.g., an email account), message management service 112 facilitates communication of messages and information related to messages between client 102, 104, 106 and message provider 108. As a number of clients and volume of messages increase, message management service 112 can be expanded to include additional computing resources to manage information (e.g., information about related messages) for one or a combination of multiple clients, accounts, or message providers, unlike client devices that can be limited in computing resources.

In some embodiments, message management service 112 can use a persistent IMAP connection for accessing one or more services provided by message provider 108. Additionally or alternatively, message management service 112 can use communication protocols such as POP messaging application programming interface (MAPI)/exchange, service application programming interfaces (service APIs) and/or any type of connection for interaction with message provider 108. Outgoing messages can be delivered to the message provider 108 through using a communication protocol such as a Simple Mail Transfer Protocol (SMTP) or any other message communication protocol. Message management service 112 can translate account or message updates delivered from a client into appropriate actions to execute on message provider 108.

Based on messages it receives, message management service 112 can determine relationships between messages. Relationships between messages may not be limited by message accounts or message providers. The messages received from message provider 108 can be less than all messages for an account. Message management service 112 can inspect messages accessed from message provider 108 to determine one or more threads of the messages. Message management service 112 can store information identifying threads of related messages. Thread IDs can be stored for messages and reference messages identified in the received messages. Management of thread information at an intermediary computing system, such as message management service 112, enables additional value added services to be provided to clients, such as clients 102, 104, 106. For example, the thread information can be useful to enable message management service 112 to group messages into folders or categories based on the thread information. Information about grouping of messages can be provided to clients for use in presenting messages.

The information stored by message management service 112 can enable one or more clients 102, 104, 106, message provider 108, or both, to improve management and access to messages. Message management service 112 can provide information about related messages to clients to enable clients to effectively understand relationships between the messages. Messages can then be provided from message management service to the client in an organized manner, thereby reducing use of computing resources at a client to manage messages. Identified message threads can be useful for any service or device that desires to manage activity and actions with respect to messages. Methods for identifying and managing thread information about messages are described below with reference to FIGS. 2-7.

Figure 2:
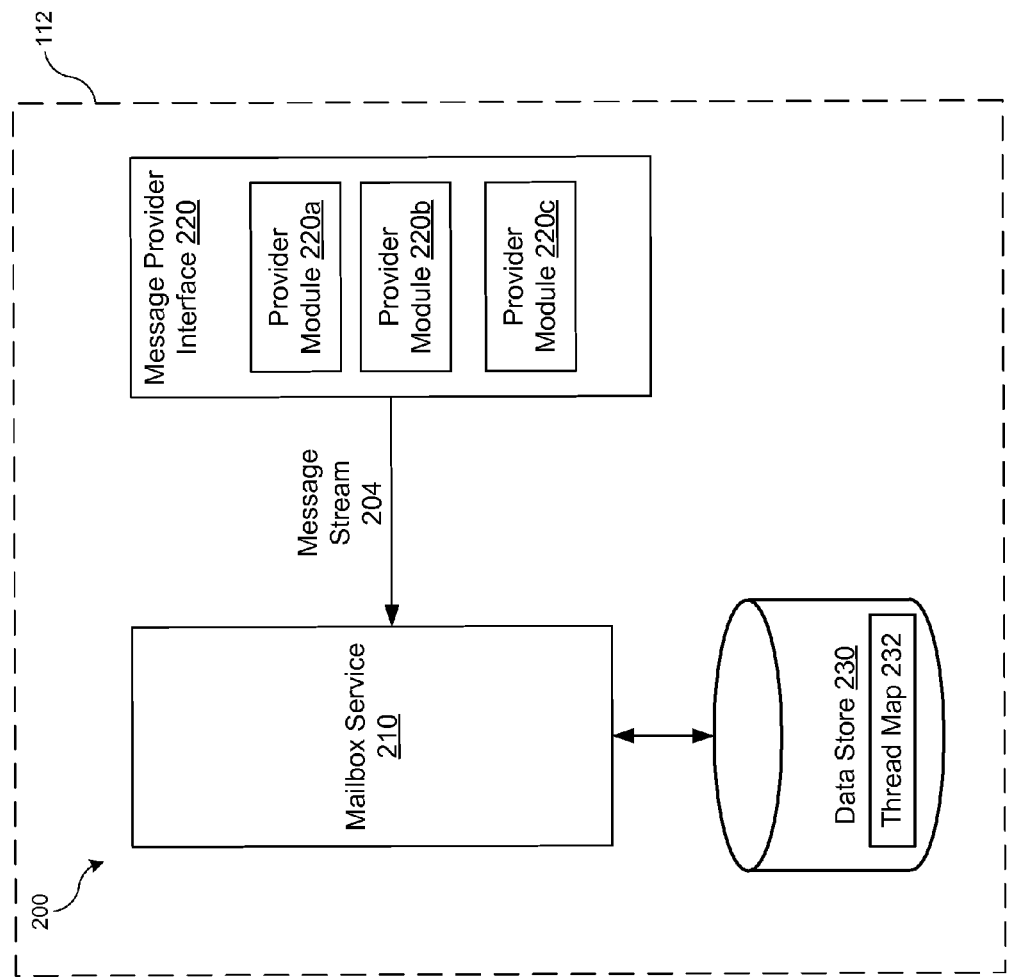
FIG. 2 is a functional block diagram of components of a message management service according to some embodiments of the present invention.

FIG. 2 shows a functional block diagram 200 of components of a message management service according to some embodiments of the present invention. The message management service can include or implement message management service 112 of FIG. 1.

Message management service 112, according to some embodiments, is an intermediary that sits between service providers 108 and clients 102, 104, 106. Message management service 112 can communicatively coupled (e.g., via the Internet) to applications of clients 102, 104, 106 and communicatively coupled (e.g., via the Internet) to message provider 108. Message management service 112 can function as a proxy for clients 102, 104, 106. In these embodiments, message management service 112 can receive incoming messages from message provider 108 and can route the incoming messages to clients 102, 104, 106. Similarly, message management service 112 can receive outgoing messages from clients 102, 104, 106, and routes such outgoing messages to message provider 108.

Message management service 112 can include a mailbox service 210 that performs identification and management of thread information. Mailbox service 210 can function to manage the mailbox of messages for clients 102, 104, 106. Mailbox service 210 can leverage a custom network protocol optimized for modern message communication with one or both of clients 102, 104, 106 or message provider 108. Alternatively, any suitable protocol can be used such as HTTP.

Mailbox service 210 can provide any number of services. A service can include message windowing. Message windowing describes the transfer of only immediately relevant messages to the client application. For example, mailbox service 210 only transfers information for the 100 most recent messages when a user accesses a message inbox even if there are 500 unread messages that the user has not seen. Mailbox service 210 can provide other services such as message application functions, archiving and backfilling related emails, grouping and threading related messages, enabling a user to search messages, and so on. Another example service is associating messages into a thread associated with a thread ID. A thread can be related messages such as messages replying to another message; messages forwarding another message; messages with shared subjects, bodies, senders and/or recipients, dates and/or times; a message quoting a portion of another message and/or any grouping of messages based on information in the messages.

Embodiments of mailbox service 210 can interface with message provider 108. As each message provider 108 can have a custom implementation, message management service 112 can include message provider interface 220 that includes provider modules or components 220a-220c, each specifically configured to interface with a different message provider 108. For example, one of provider modules 220a-220c can be configured specifically for an intended message provider 108 and can include rules and processing instructions to account for message format issues, for interpretation of message updates, specialized features or capabilities, and/or any processing that can be specific to an intended message provider 108.

Mailbox service 210 can manage state and windowing of multiple message streams, such as message stream 204 received from message provider 108. A message stream can refer to a collection of messages. For example, a message stream can correspond to a folder in an email account. Other message streams can correspond to archived messages, message folders, labels, special folders (e.g., starred messages or deferred messages), and/or any collection of messages.

Functions described as being performed here by mailbox service 210 can be performed on messages saved in data store 230. Data store 230 can be used to store information including a thread map 232 having thread information identified and managed by mailbox service 210. Data store 230 can be included in any type of persistent storage device, such as a memory storage device. Thread map 232 can be implemented using any type of data structure, such that the data structure enables access to a message ID and/or a thread ID for each message or reference message associated with a thread. In some embodiments, thread map 232 can be implemented to enable each message ID to be identified based on association with a thread ID, or vice versa. In a particular embodiment, data store 230 can be implemented using MongoDB®, a relational database, or other types of databases. FIGS. 3A, 3B, 4A, and 4B show an example of message processing to identify message threads according to some embodiments of the present invention.

Message management service 112 can determine information that identifies a thread to which each message is related. A thread can be identified based on messages that have been received by message management service 112. The messages can be recent messages that are requested by a client. For example, recent messages can be limited to an amount of messages corresponding to a message window or a size of a folder of messages requested by the client. FIGS. 3A, 3B, 4A, and 4B show processing of messages that have been received via one or more message streams, such as message stream 302. In some embodiments, message management service 112 may not receive all messages that correspond to an account managed at a message provider 108, and identification of threads can be performed based on any messages that message management service 112 has received from message provider 108. Message management service 112 can process additional messages received out of order or received in response to a backfill request from a client. Message management service 112 can determine whether out of order messages or older messages correspond to an existing thread or belong to a new thread.

In FIGS. 3A, 3B, 4A, and 4B, message stream 302 corresponds to a stream of messages received from message provider 108 for a message account that can be managed by message provider 108. In some embodiments, messages can be received from multiple message streams. Each of the message streams can be received from different message providers, such as message provider 108. Message stream 302 can include messages received from multiple message providers, such as message provider 108. Message 302 can correspond to messages provided for a folder associated with the account. Message stream 302 can include multiple messages, without limitation, including message 1 (M1) 310, message 2 (M2) 320, message 3 (M3) 330, message 4 (M4) 340, message 5 (M5) 350, message 6 (M6) 360, and message 7 (M7) 370. Messages received via message stream 302 can correspond to an order of messages starting with most recent messages, M7 370, M6 360, M5 350, M4 340, and ending with older messages M1 310, M2 320, and M3 330. An order of messages received via message stream 302 can correspond to an order that messages are received from message service provider 208. Alternatively or additionally, an order of messages received via message stream 302 can correspond to an order that messages are created. Although M1-M7 310-370 are shown as being received in order corresponding to arrangement in message stream 302, M1-M7 310-370 may not be received during a continuous time period. In some embodiments, M1-M7 310-370 can be received out of order. For example, more recent messages, such as M7 370, M6 360, M5 350, and M4 340, can be received before older messages M3 330, M2 320, and M1 310. Older messages can be received after most recent messages due to windowing of a number of messages at a client or backfill mechanism. In another example, M3 330, M2 320, and M1 310 can be received by message management service 112 via message stream 302 out of order from M7 370, M6 360, M5 350, and M4 340. In this example, M3 330, M2 320, and M1 310 can be received by message management service 112 at a later time period after more recent messages M7 370, M6 360, M5 350, and M4 340 are received. Such a later time period can correspond to a backfill event 390 that occurs in response to a backfill message request from a client (e.g., client 102) to receive older messages to fill messages in a window after recent messages have been removed from view. Backfill event 390 can correspond to a period of time that occurs between a time when M4 340 is received and when M3 330 is received.

Figure 3A:
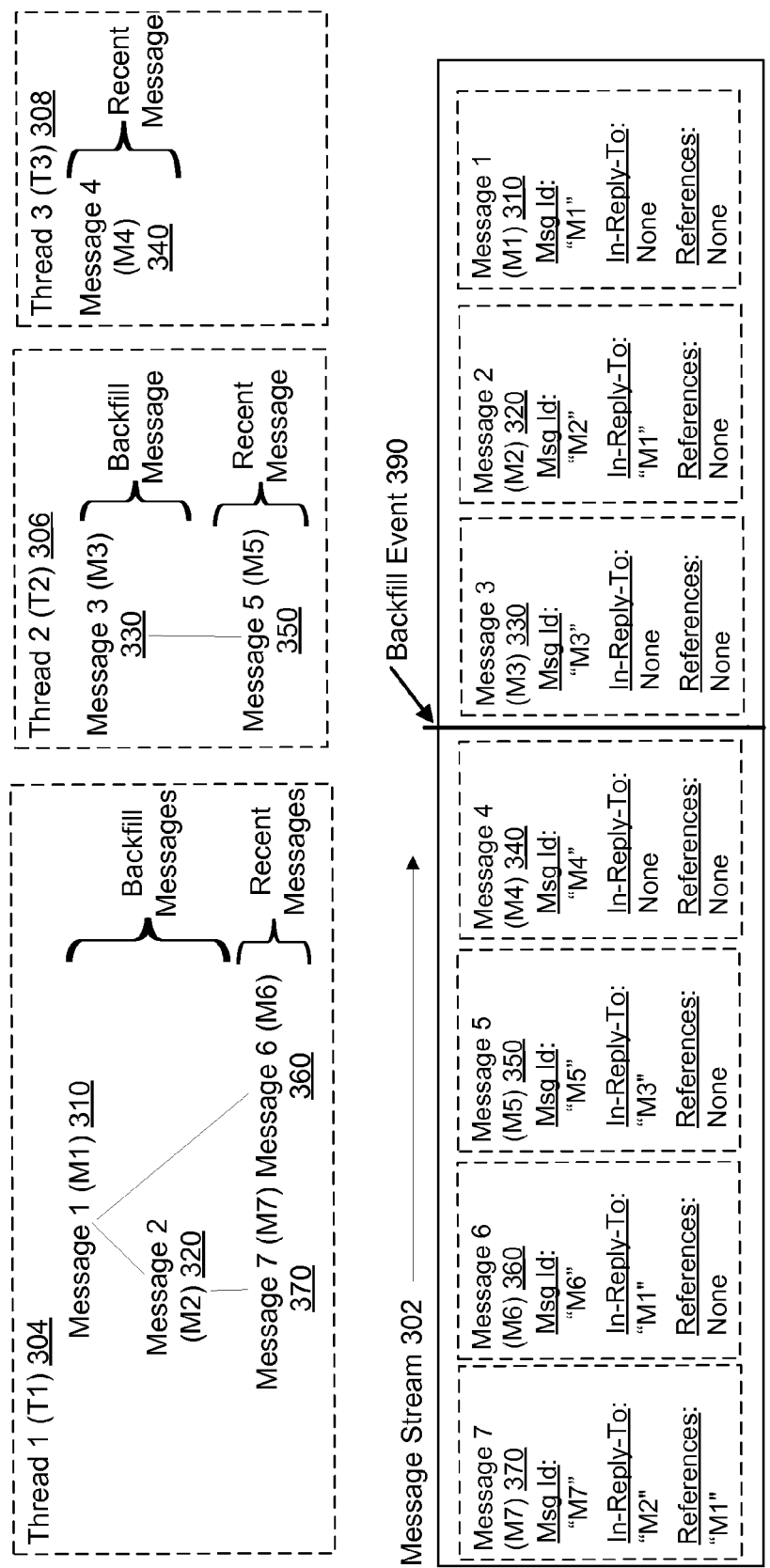
FIGS. 3A and 3B show diagrams of an example of message processing to identify message threads according to some embodiments of the present invention.

Thread 304, thread 306, and thread 308 in FIG. 3A are shown to illustrate relationships of messages, such as threads that can be determined based on a relationship of messages M1 310, M2 320, M3 330, M4 340, M5 350, M6 360, and M7 370. Message management service 112 can identify a thread 1 304 of communication associated with thread ID "T1," which includes M1 310, M2 320, M6 360, and M7 370 that can be related. Message management service 112 can identify a thread 2 306 of communication associated with thread ID "T2," which includes M3 330 and M5 350 that can be related. Message management service 112 can identify a thread 3 308 of communication associated with thread ID "T3," which includes M4 340 that can be related. According to an embodiment of the present invention, threads 304, 306, 308 can be identified based on processing of messages M1 310, M2 320, M3 330, M4 340, M5 350, M6 360, and M7 370. Thread 1 304, thread 2 306, and thread 3 308 are examples of threads that are identified based on processing of message received via message stream 302.

In the example shown in FIGS. 3A, 3B, 4A, and 4B, recent messages M7 370, M6 360, M5 350, M4 340 are received first via message stream 302 and M3 330, M2 320, and M1 310 can be received second at a later time period. Each message received by message management service 112 can be processed to identify a thread to which each message belongs. Received messages can be processed to determine threads according to an order of receipt via message stream 302. In some embodiments, the received messages can be processed based on an order that is independent of an order in which the messages are received via message stream 302.

Message management service 112 can process each of the received messages, M7 370, M6 360, M5 350, and M4 340 to identify a thread corresponding to each received message. For example, message management service 112 can inspect a message to determine whether the message includes a header and/or information that identifies the message and/or other related messages. A message can include a message ID (or msg ID) that identifies a message. In an implementation, message ID can be a unique identifier that uniquely identifies a message in a message system, such that no two messages can have the same message ID. In some embodiments, a message ID can be established for a message when the message is created. The message ID can be based on a combination of an email address the sends the message, a time stamp when the message is created/sent, and a date when the message is created/sent. In some embodiments, the message ID can be based on a time stamp when the message is created, a date when the message is created, and a domain name of a message provider (e.g., a host system). The header can include an "in-reply-to" field that identifies a parent ID of a parent message in response to which the message was communicated (e.g., en email message replying to another email message). The header can include a "references" field that identifies one or more reference identifiers (reference IDs) of messages that are related to the message. Related messages can include one or more predecessor messages, such as a reference message that is an ancestor (e.g., a grandparent message or a great grandparent message) of the message. The reference ID and/or the parent ID can be a message ID of a message.

Message management service 112 can use a message ID in a message (e.g., a message ID in a header of a message) to identify a thread of communication to which the message belongs. In some embodiments, a message can belong to at most one thread. At most one thread ID can be assigned to a message. As message management service 112 processes each message, message management service 112 can assign a thread ID each message that has not previously been associated with a thread ID.

Thread map 232 in data store 230 can store information relating different messages. Thread map 232 stores a thread ID that identifies a thread and associates a thread ID with a message ID of each known message that belongs to the thread. To illustrate, thread map 232 can be a table that contains an entry for each message and a thread ID corresponding to a thread with which the message is associated. By storing thread IDs for different messages, the server can identify messages that are common to a thread based on thread ID.

Figure 3B:
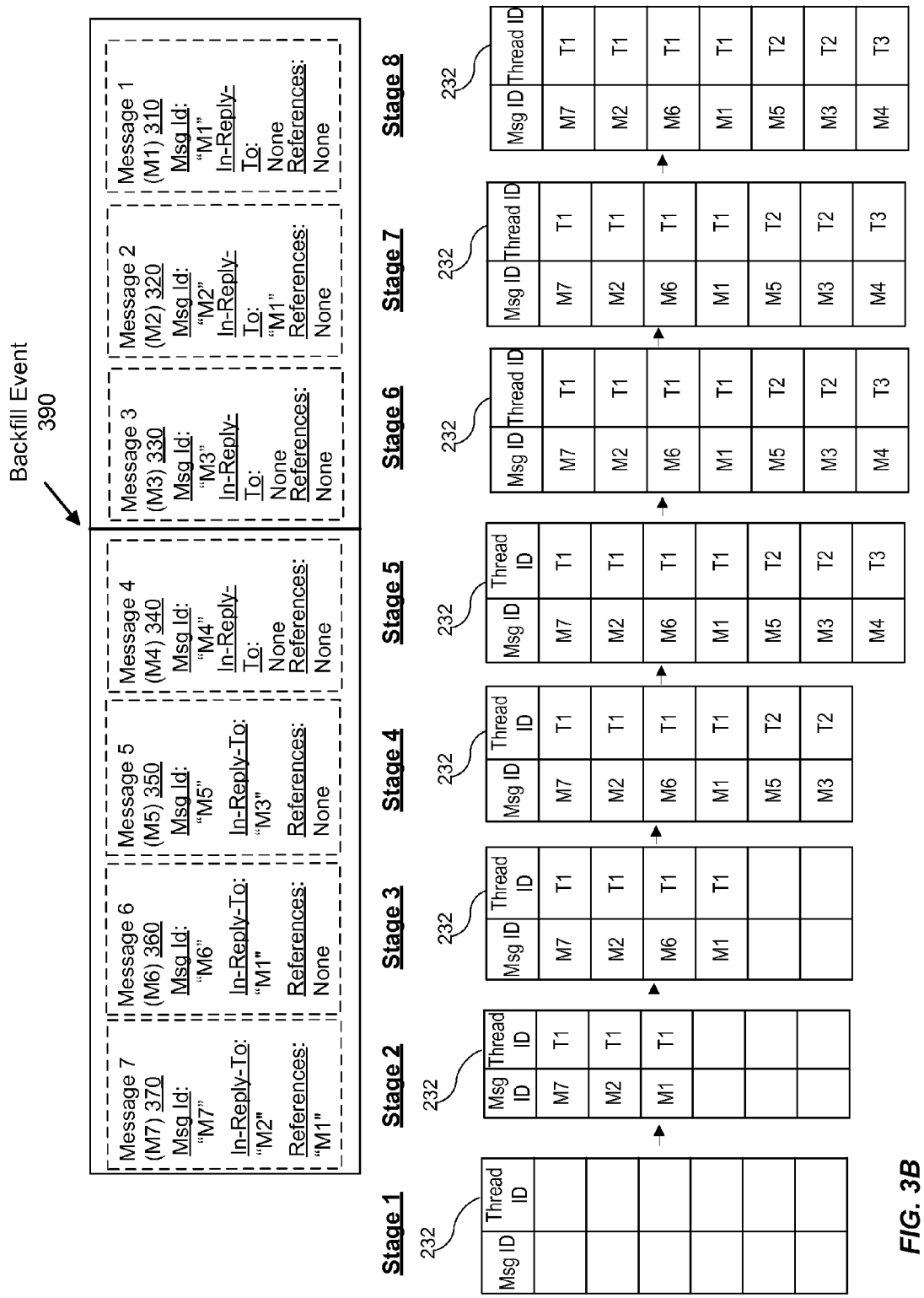

Now turning to FIG. 3B, an example of processing messages received via message stream 302 is illustrated. FIG. 3B shows a progression of information stored in thread map 232 as each message in message stream 302 is processed through stages 1-8.

At stage 1, before M7 370 can be processed, thread map 232 can be empty as shown. In some embodiments, thread map 232 can contain one or more entries, each corresponding to a thread ID associated with a message ID.

At stage 2, M7 370 can be processed from message stream 302 to identify a thread corresponding to M7 370. Thread map 232 is examined to determine whether a thread ID can be identified for M7 370. Specifically, a search of thread map 232 is conducted to determine whether message ID, "M7", is stored in thread map 232.

In this example, thread map 232 does not contain an entry with msg ID "M7." However, in some embodiments, thread map 232 can contain an entry with msg ID "M7" in the event that another message was processed that referenced msg ID "M7." Before a determination is made that a new thread ID can be assigned to M7 370, a search of thread map 232 is conducted to determine whether thread map contains one or more reference messages identified in M7 370. Thread map 232 can be searched to locate reference msg IDs for reference message M1 310 and reference message M2 320. Because thread map 232 does not contain thread IDs for either M1 310 or M2 320, a new thread ID "T1" 304 is assigned to M1 310, M2 320, and M7 370. Message management service 112 stores in thread map 232 an entry including "T1" for the msg ID associated with each of M1 310, M2 320, and M7 370.

At stage 3, M6 360 can be processed. Thread map 232 can be searched to locate msg ID "M6", which cannot be found in this example. Thread map 232 can be searched for reference msg ID "M1" for M1 310. Identification of "M1" in thread map 232 identifies an association with thread ID T1 304. M6 360 is assigned thread ID T1 304 because a parent message M1 310 is associated with thread ID T1. Message management service 112 stores in thread map 232 an entry including "T1" associated with msg ID "M6."

At stage 4, M5 350 can be processed. Thread map 232 can be searched to locate msg ID "M5", which cannot be found in this example. Thread map 232 can be searched for reference message ID "M3" for M3 330, which is not found in thread map 232. Since msg ID "M5" and msg ID "M3" cannot be found, a new thread ID "T2" 306 is assigned to M5 350 and M3 330. Next M4 340 can be processed. Message management service 112 stores in thread map 232 an entry for "T2" for the msg ID associated with each of msg M5 350 and M3 330.

At stage 5, M4 340 can be processed. Thread map 232 can be searched to locate msg ID "M4", which cannot be found in this example. Since msg ID "M4" cannot be found, a new thread ID "T3" 308 is assigned to M4 340. Message management service 112 stores in thread map 232 an entry for "T3" associated with M4 340.

After stage 5, message stream 302 may not contain messages, such as M3 330, M2 320, and M1 310 until a period of time passes. These messages may not be received because of delays caused in transmission of messages, limitations on messages requested from message provider 108, or other events that cause messages, such as M3 330, M2 320, and M1 310, to be received at a later time. One such scenario, M3 330, M2 320, and M1 310 are received in the event that a backfill event 390 occurs, such that a client 102, 104, 106 requests message management service 112 to obtain older messages to backfill a message folder presented. Such a request can cause the mailbox service 210 to request additional messages from message provider 108 which are received via message stream 302.

At stage 6, M3 330 can be processed from message stream 302. Thread map 232 can be examined to determine whether a thread ID can be identified for M3 330. A new entry is not created for M3 330 because thread map 232 has an entry for msg ID "M3" associated with T2 306. Similarly, at stage 7 when M2 320 can be processed and at stage 8 when M1 310 are processed, a new entry is not created for either M1 310 or M2 320 since msgIDs for these messages are stored in thread map 232 in association with a T1 304. Therefore, thread map 232 has correct information identifying distinct threads messages M1-M7 310-370 associated with one of T1 304, T2 306, or T3 308. Subsequent messages that are received by message management service 112 via message stream 302 or another message stream can be processed to determine whether each message is associated with a thread identified in thread map 232.

The techniques for identifying and managing information about message threads enables a messaging system to manage information about related messages that can be received from a message provider. Regardless of whether messages are received in order or at different times due to delay or backfill requests, information in a message, such as a message ID and/or reference message IDs can be used to manage information about threads of messages. Information identifying threads of messages can be inspected and updated as each message is processed to ensure that related messages are associated with a common thread, thereby enabling consistency of threading of messages. For clients that can be limited by computing resources, a message management service can provide information identifying threads to the clients to enable clients to present messages in threads consistently. In some embodiments, the information about message threads can be provided to message service providers, which can use information about the message threads to reduce storage otherwise used for thread management. The thread information managed in a data store as described herein can be used to identify new messages that are related to previously identified threads.

Figure 4A:
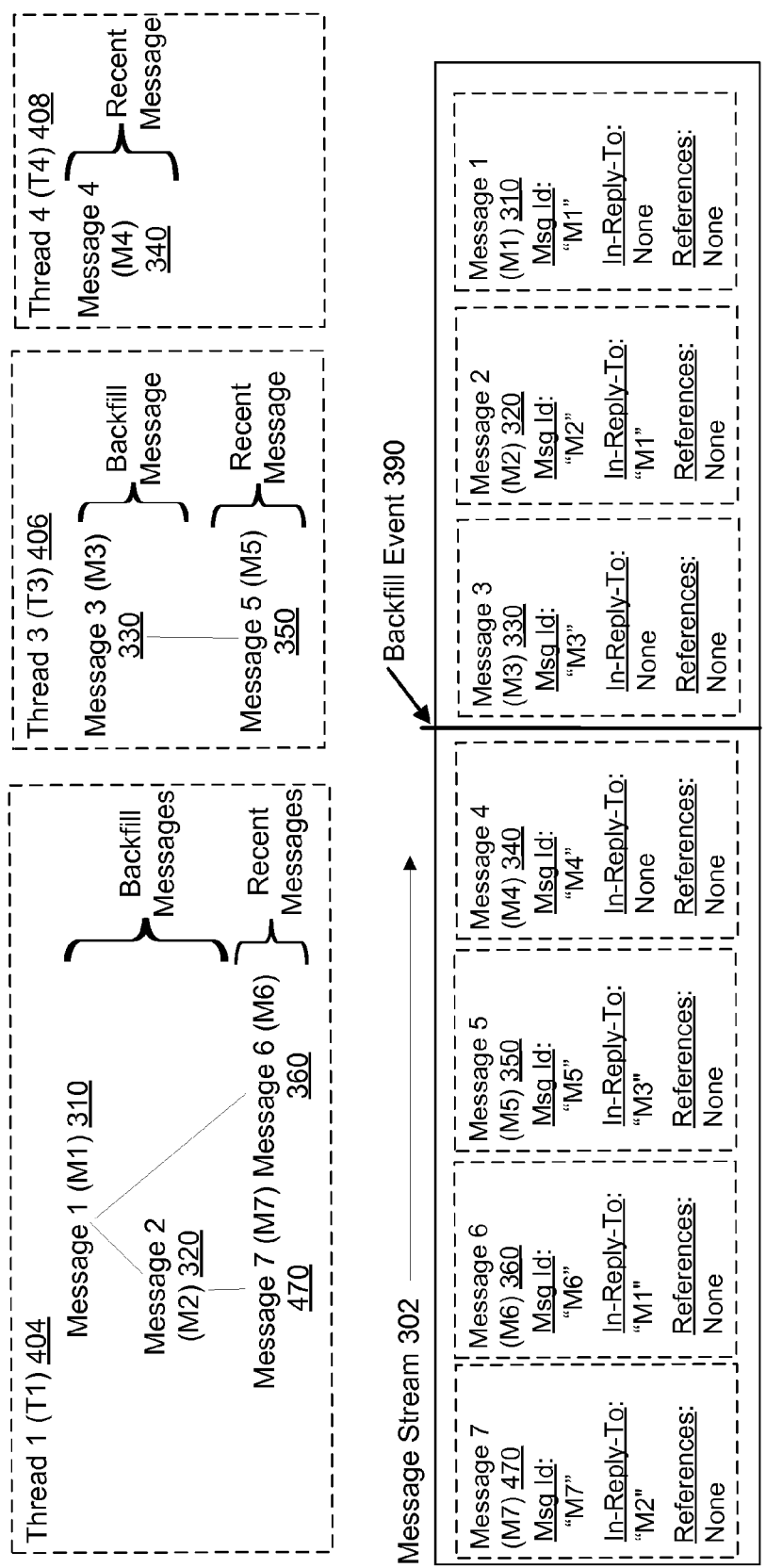
FIGS. 4A and 4B show diagrams of an example of message processing to identify message threads according to some embodiments of the present invention.
Figure 4B:
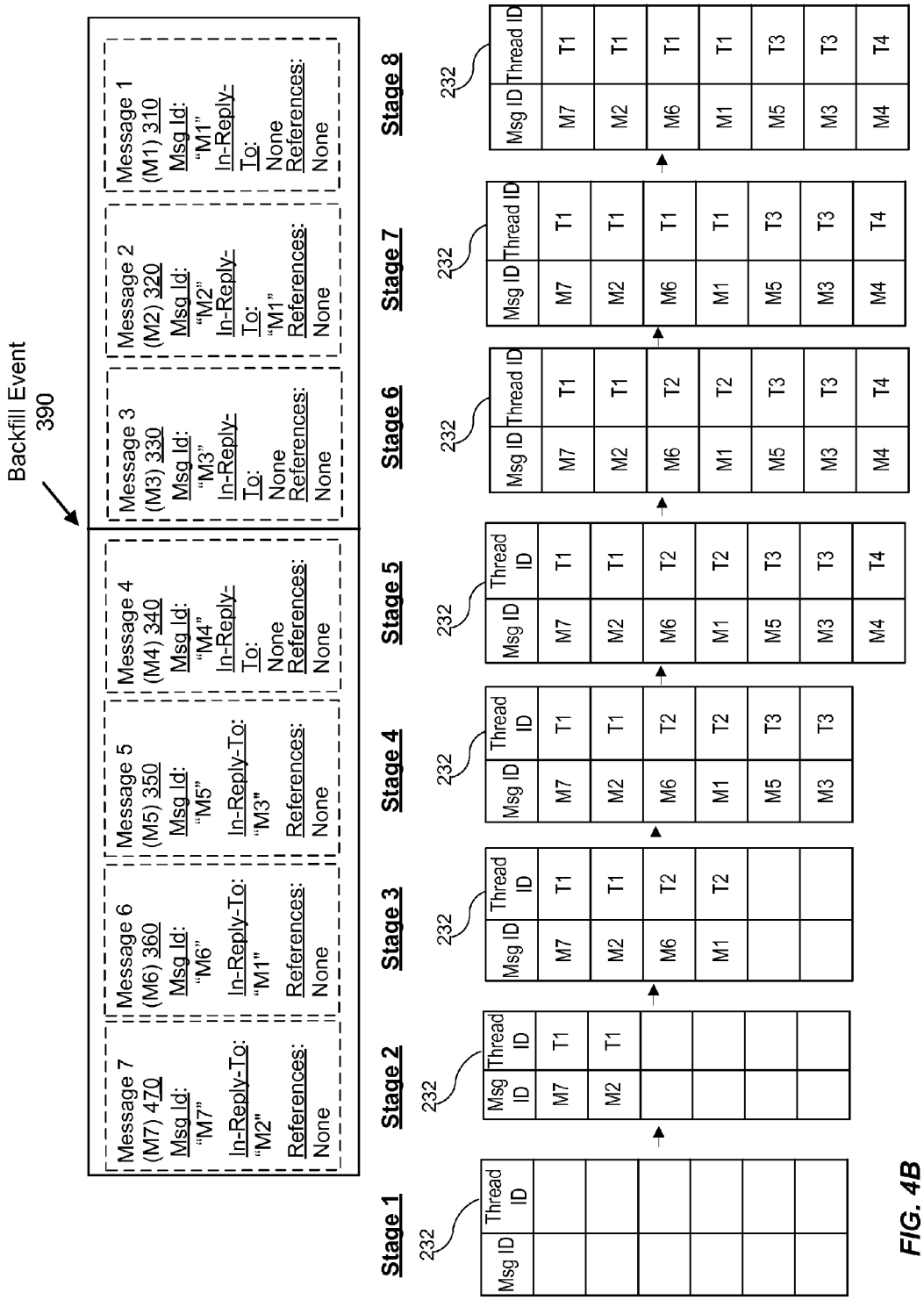

Now turning to FIGS. 4A and 4B, another example of processing messages received via message stream 302 is shown. FIG. 4A shows thread 404, thread 406, and thread 408 to illustrate relationships of messages, such as threads that can be determined based on a relationship of messages M1 310, M2 320, M3 330, M4 340, M5 350, M6 360, and M7 470. Message management service 112 can identify a thread 1 404 of communication associated with thread ID "T1," which includes M1 310, M2 320, M6 360, and M7 470 that can be related. In the example shown in FIGS. 4A and 4B, during processing of messages received via message stream 302, message management service 112 can identify a thread 2 "T2" that includes M6 360 and M1 310. Thread T2 is identified temporarily until message management service 112 can determine that M1 310 and M6 360 are associated with thread T1 404. Message management service 112 can identify a thread 3 406 of communication associated with thread ID "T3," which includes M3 330 and M5 350 that can be related. Message management service 112 can identify a thread 4 408 of communication associated with thread ID "T4," which includes M4 340. According to an embodiment of the present invention, threads T1 404, T3 406, and T4 408 can be correctly identified as threads based on processing of messages M1 310, M2 320, M3 330, M4 340, M5 350, M6 360, and M7 370.

FIG. 4B shows a progression of information stored in thread map 232 as each message in message stream 302 is processed through stages 1-8. Message stream 302 includes M7 470, which does not include a reference message ID for M1 310 compared to M7 370 in the example of FIGS. 3A and 3B.

At stage 1, before M7 470 can be processed, thread map 232 can be empty as shown. At stage 2, M7 470 can be processed from message stream 302 to identify a thread corresponding to M7 470. Thread map 232 is examined to determine whether a thread ID can be been identified for M7 470. In this example, thread map 232 does not contain an entry with msg ID "M7." Thread map 232 can be searched to locate reference msg IDs for reference message M2 320. Because thread map 232 does not contain thread IDs for either M2 320, a new thread ID "T1" 404 is assigned to M2 320 and M7 470. Message management service 112 stores in thread map 232 an entry including "T1" for the msg ID associated with each of M2 320 and M7 470.

At stage 3, M6 360 can be processed. Thread map 232 can be searched to locate msg ID "M6", and reference msg ID "M1" for M1 310. However, FIG. 3A shows M1 310 is associated with the same thread ID T1 304 as M7 370 and M2 320. Because thread map 232 does not contain an entry for M1 310, message management service 112 assigns a new thread "T2" to M6 360. M1 310 is assigned to thread T2 because M1 310 is a reference message of M6 360. Message management service 112 assigns T2 to M6 360 and M1 310 until message management service 112 can determine that M6 360 and M1 310 are associated with message IDs in T1 404.

At stage 4, M5 350 can be processed. Thread map 232 can be searched to locate msg ID "M5", which is not found in this example. Thread map 232 can be searched for reference message ID "M3" for M3 330, which is not found in thread map 232. Since msg ID "M5" and msg ID "M3" cannot be found, a new thread ID "T3" 406 is assigned to M5 350 and M3 330. Next M4 340 can be processed. Message management service 112 stores in thread map 232 an entry for "T3" for the msg ID associated with each of msg M5 350 and M3 330.

At stage 5, M4 340 can be processed. Thread map 232 can be searched to locate msg ID "M4", which cannot be found in this example. Since msg ID "M4" cannot be found, a new thread ID "T4" 408 is assigned to M4 340. Message management service 112 stores in thread map 232 an entry for "T4" associated with M4 340.

After stage 5, message stream 302 may not contain messages, such as M3 330, M2 320, and M1 310 until a period of time passes. These messages may not be received because of delays caused in transmission of messages, limitations on messages requested from message provider 108, or other events that cause messages, such as M3 330, M2 320, and M1 310, to be received at a later time.

At stage 6, M3 330 can be processed from message stream 302. Thread map 232 is examined to determine whether a thread ID can be identified for M3 330. A new entry is not created for M3 330 because thread map 232 has an entry for msg ID "M3" associated with T3 406.

At stage 7, M2 320 can be processed from message stream 302. Thread map 232 is examined to determine whether a thread ID can be identified. An entry for M2 320 can be identified in thread map 232 associated with thread T1 404. Message management service 112 examines thread map 232 to determine whether reference msg ID for M1 310 is stored in thread map 232. In this example, thread map 232 contains an entry for M1 310 stored in association with thread T2. However, M1 310 and M2 320 can be related because M1 310 is a reference message identified in M2 320. To ensure consistent threading such that M1 310 and M2 320 are associated with the same thread, message management service assigns a common thread to M1 310 and M1 320. In some embodiments, thread map 232 can be updated to store M1 310 in association with T1 404 that is associated with M2 320. In some embodiments, thread map 232 can be updated to store M2 320 in association with T2 that is associated with M1 310. Alternatively, message management service 112 can assign a new thread ID to M1 310 and M2 320. To ensure that other related message IDs stored in thread map 232 remain threaded with messages that have been modified in thread map 232, message management service 112 can search for msg IDs of messages having a thread ID associated with M1 310 or M2 320 before thread map 232 was modified.

In the example shown in FIG. 4B, T2 associated with M1 310 can be changed to T1 404 because M1 310 is a reference message of M2 320. Message management service 112 can search for other message IDs associated with T2 and change these to T1 404 because T2 associated with M1 310 is changed to T1 404. A search of thread map 232 identifies M6 360 associated with T2. M6 360 can be changed to T1 404 because M6 360 is related to message M1 310. In some embodiments where thread map is changed so that M2 320 is associated with T2, then any other message ID associated with T1 is changed to be associated with T2. By checking and updating thread map 232 to update thread IDs, consistent threading can be achieved such that messages received via stream 302 are properly associated with a same thread. For example, at stage 7, M1 310 and M6 360 can be properly associated with a same thread as M2 320 and M7 470, thereby enabling consistent threading.

At stage 8, M1 310 can be processed from message stream 302. In this embodiment, a new entry is not created for M1 310 since "M1" correctly stored in thread map 232 in association with a T1 404. Therefore, thread map 232 has correct information identifying distinct threads messages M1-M7 310-470 associated with one of T1 404, T3 406, or T4 408.

Subsequent messages that are received by message management service 112 via message stream 302 or another message stream can be processed to determine whether each message is associated with a thread identified in thread map 232.

Figure 5:
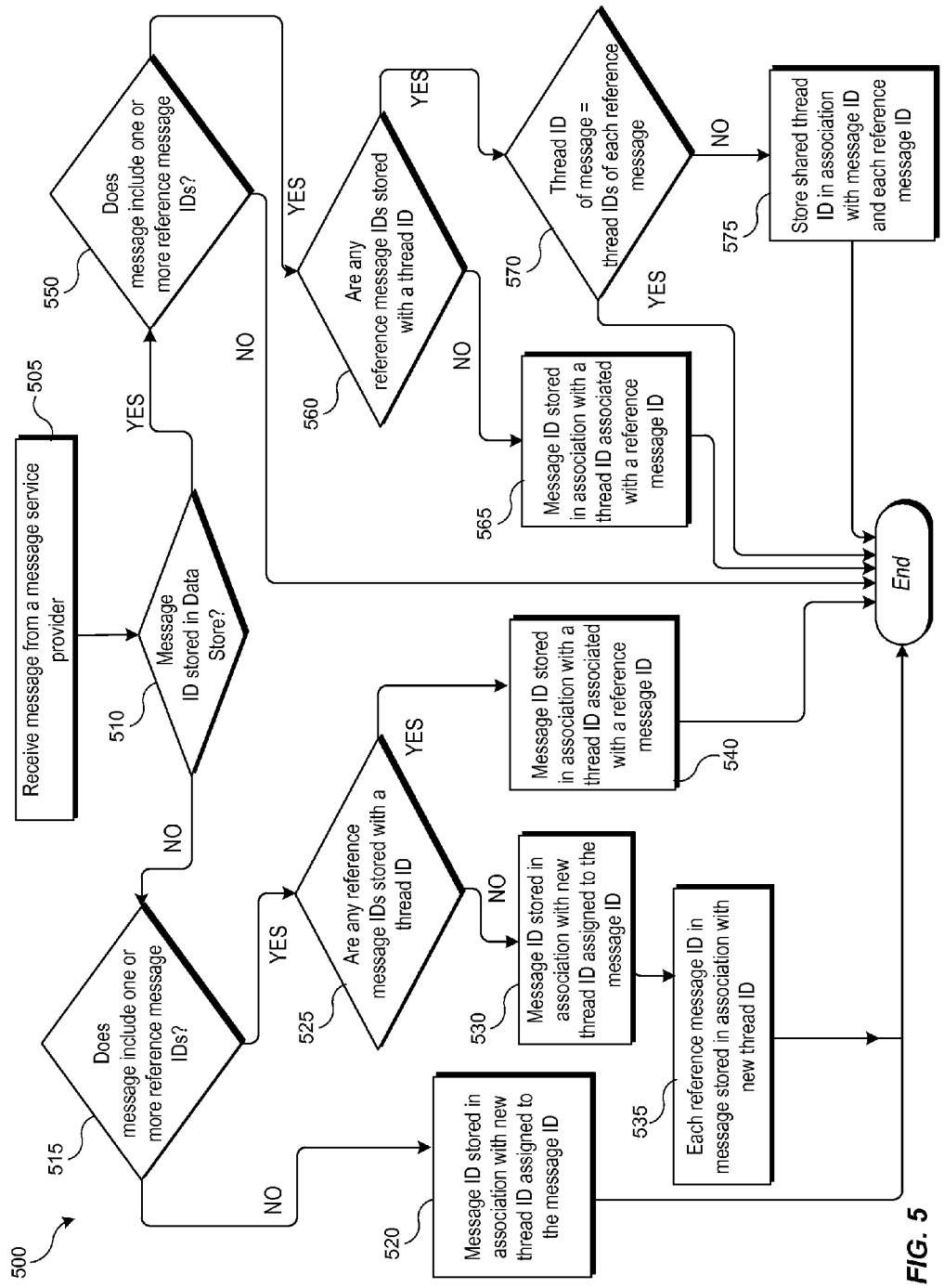
FIG. 5 is a flow diagram of a process for managing information about message threads according to some embodiments of the present invention.

FIG. 5 shows a flow diagram of a process 500 for managing information about message threads according to some embodiments of the present invention. In an embodiment, process 500 can be implemented, e.g., in message management service 112 of FIG. 1.

The process 500 can begin at block 505 when one or more messages are received. Messages can be received by message management service 112. The messages can be received via a message stream, such as message stream 204 from message provider 108. Process 500 can proceed to process each of the received messages. Process 500 can be repeated for processing of each message received by message management service 112. At decision block 510, process 500 can determine whether a message ID that is included in a received message is stored in association with a thread ID in a data store (e.g., data store 230 of FIG. 2). For example, message management service 112 can search thread map 232 in FIG. 2 for a message ID of the received message for an entry with the message ID associated with a thread ID. Identification of a message ID in data store 230 indicates that the received message is associated with a thread that can be identified by the thread ID associated with the message ID.

If, at decision block 510, it is determined that a message ID included in a received message is not stored in association with a thread ID in a data store, then at decision block 515, process 500 can determine whether the message includes one or more reference message IDs.

If, at decision block 515, it is determined that the message does not include any reference message IDs, then at block 520, process 500 can assign a new thread ID to message ID, e.g., by storing in the data store 320 the message ID in association with the new thread ID. Therefore, process 500 can end or return to block 505 to process another message.

If, at decision block 515, it is determined that the message includes one or more reference message IDs, then at decision block 525, process 500 can determine whether any reference message ID identified at decision block 515 is stored in association with a thread ID in data store 230. In some embodiments, process 500 can determine whether each reference message ID is stored in association with a thread ID.

If, at decision block 525, it is determined that at least one reference message ID is stored in association with a thread ID, process 500 can proceed to block 540. If, at decision block 525, it is determined that at least one reference message ID is stored in association with a thread ID, process 500 can proceed to block 530.

At block 530, process 500 can store the message ID in association with a new thread ID. At block 535, process 500 can store each reference ID in association with the new thread ID that was assigned to the message ID at block 530. Process 500 can end or return to block 505 to process another message.

If, at decision block 525, it is determined that at least one reference message ID is stored in association with a thread ID, process 500 can proceed to block 540. At decision block 540, process 500 can store the message ID in association with the thread ID associated with a reference message ID. A thread ID associated with one of the reference message IDs can be assigned to the message ID. The message ID can assume the same thread ID as a reference message because the reference message shares the same thread as a related reference message. Process 500 assigns a thread ID of the reference message ID to the message ID for storage. In some embodiments, more than one reference message ID may be associated with a thread ID, where the thread ID for each reference message is different. In these embodiments, message management service 112 can determine a common thread ID to each reference message associated with a thread ID. The common thread ID can be assigned to the message ID that assumes the thread ID of the reference messages. Further details with regard to determining a common thread ID can be described with reference to FIG. 6.

Now returning to decision block 510, if it is determined that a message ID included in a received message is stored in association with a thread ID in a data store, process 500 can proceed to decision block 550. At decision block 550, process 500 can determine whether the message includes one or more reference message IDs. If, at decision block 550, it is determined that the message does not include one or more reference message IDs, process 500 can end or return to block 505 to process another message. If, at decision block 550, it is determined that the message includes one or more reference message IDs, process 500 can proceed to decision block 560.

At decision block 560, process 500 can determine whether any reference message IDs identified at block 550 are stored in association with a thread ID in the data store 230. If, at decision block 560, it is determined that at least one reference message ID is stored in association with a thread ID, then at block 565, process 500 can store in the data store 230 each of the reference message IDs in association with the thread ID that is already associated with the message ID. The thread ID associated with the message ID can be assigned to each of the one or more reference IDs because the reference messages can be related to the message based on identification of the reference message IDs in the message. Process 500 includes assigning the thread ID to the reference message ID for storage in the data store 230. Process 500 can end or return to block 505 to process another message.

If, at decision block 560, it is determined that at least one reference message ID is stored in association with a thread ID, then at decision block 570, process 500 can determine whether the thread ID associated with the message ID matches the thread ID associated with each of the reference message IDs identified in the message. If, at decision block 570, it is determined that the thread ID associated with the message ID matches the thread ID associated with each of the reference message IDs identified in the message, process 500 can proceed to end or return to block 505 to process another message. The thread ID associated with the message ID and each of the reference IDs may not be changed because they are associated with the same thread.

If, at decision block 570, it is determined that the thread ID associated with the message ID does not matches the thread ID associated with each of the reference message IDs identified in the message, then at block 575, process 500 can store a shared or common thread ID in associated with message ID and each reference message ID. A process for determining a shared or common thread ID for message IDs associated with a thread is described with reference to FIG. 6.

Figure 6:
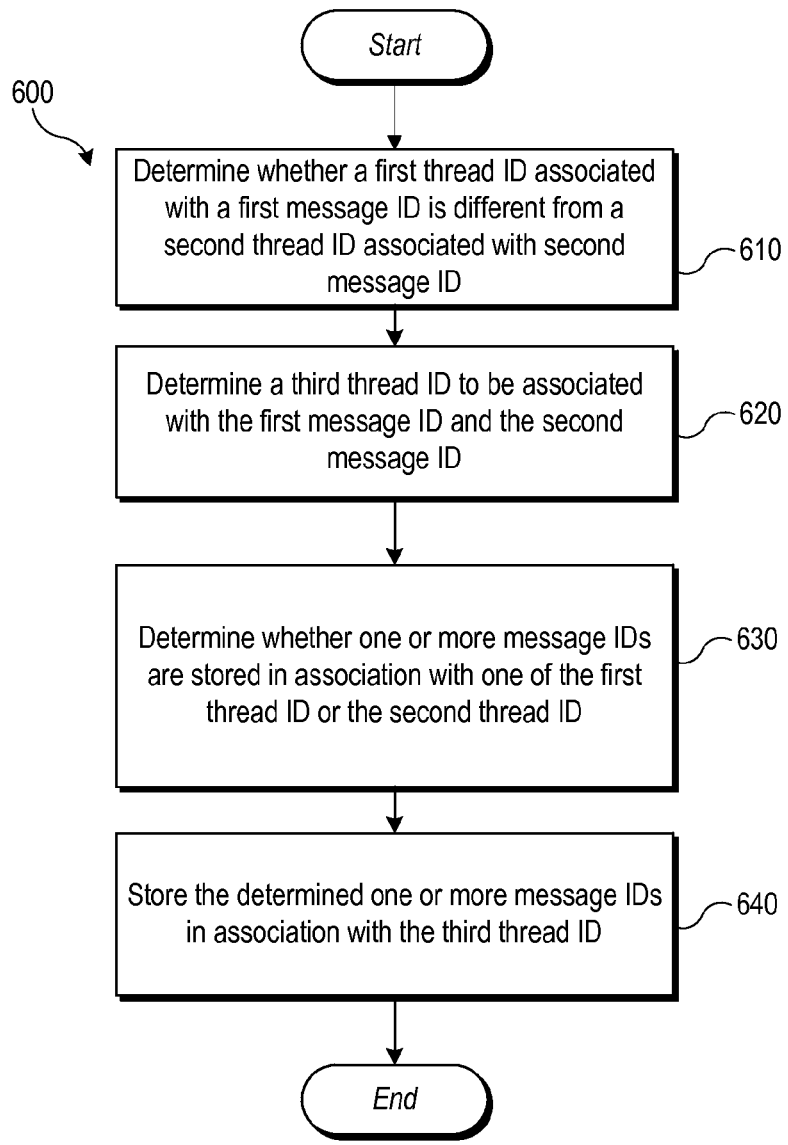
FIG. 6 is a flow diagram of a process for managing message information about message threads according to some embodiments of the present invention.

FIG. 6 shows a flow diagram of process 600 for managing message threads according to an embodiment of the present invention. In an embodiment, process 600 can be implemented, e.g., in message management service 112 of FIG. 1. In such embodiments, message management service 112 can determine a common thread ID to be associated with each message ID in a thread to ensure consistency in threading messages that are related.

At block 610, process 600 can determine whether a first thread ID associated with a first message ID is different from a second thread ID associated with a second message ID. The first message ID can identify a first message that is related to a second message identified by the second message ID. For example, at block 525 in FIG. 5, message management service 112 can determine whether more than one reference message ID in a message can be associated with different thread IDs. In another example, at block 570 of FIG. 5, message management service can determine whether a message ID is associated with a thread ID is different from a thread ID associated with one or more reference message IDs.

At block 620, message management service 112 can determine a third thread ID to be associated with the first message ID and the second message ID. The third thread ID can be selected from one of the first thread ID or the second thread ID. For example, at stage 7 of FIG. 4B, upon determining that the thread ID T2 for M1 310 is different from thread T1 of M2 320, message management service 112 can select thread ID T2 or thread ID T1 to be associated with M1 310 and M2 320 because M1 310 is a reference message of M2 320. Message management service 112 stores in the data store 230 the selected one of the first thread ID or the second thread ID in association with the first message ID and the second message ID. In some embodiments, the third thread ID can be a new thread ID.

At block 630, message management service 112 determine whether one or more message IDs are stored in association with one of the first thread ID and the second thread ID. In some embodiments win which the third thread ID is a new thread ID, message management service 112 can search thread map 232 to determine whether one or more message IDs are stored with either of the first thread ID or the second thread ID. In some embodiments where the third thread ID is one of the first thread ID or the second thread ID, message management service 112 can search thread map 232 to determine whether one or more message IDs are stored with the first thread ID or the second thread ID that is not selected as the third thread ID. For example, at stage 7 of FIG. 4B, message management service 112 can search thread map 232 to determine whether thread map 232 stores one or more messages ID that are associated with thread ID T2 that is not selected for association with M1 310 and M2 320. In this example, message management service 112 can determine that thread map 232 stores M6 360 associated with thread ID T2.

At block 640, store the determined one or more message IDs in association with the third thread ID. In some embodiments in which the third thread ID is new, each of the determined message IDs can be stored in association with the third thread ID. In some embodiments, the third thread ID can be one of the first thread ID or the second thread ID. In these embodiments, message management service 112 can store the third thread ID in association with message IDs that are associated with one of the first thread ID or the second thread ID that is not selected as the third thread ID. For example, at stage 7 of FIG. 4B, message management service 112 can store thread ID T1 in association with M6 360 that is not associated with thread ID T1.

In some embodiments discussed with reference to FIG. 6, message management service 112 can achieve consistent threading by assigning a common thread ID to message IDs that have been identified as associated with a common thread, but that have been stored in association with different thread IDs. Further, by updating thread IDs associated with other message IDs in a thread that is changed, messages of a thread can be associated with a common thread ID to maintain consistency of threaded messages.

Figure 7:
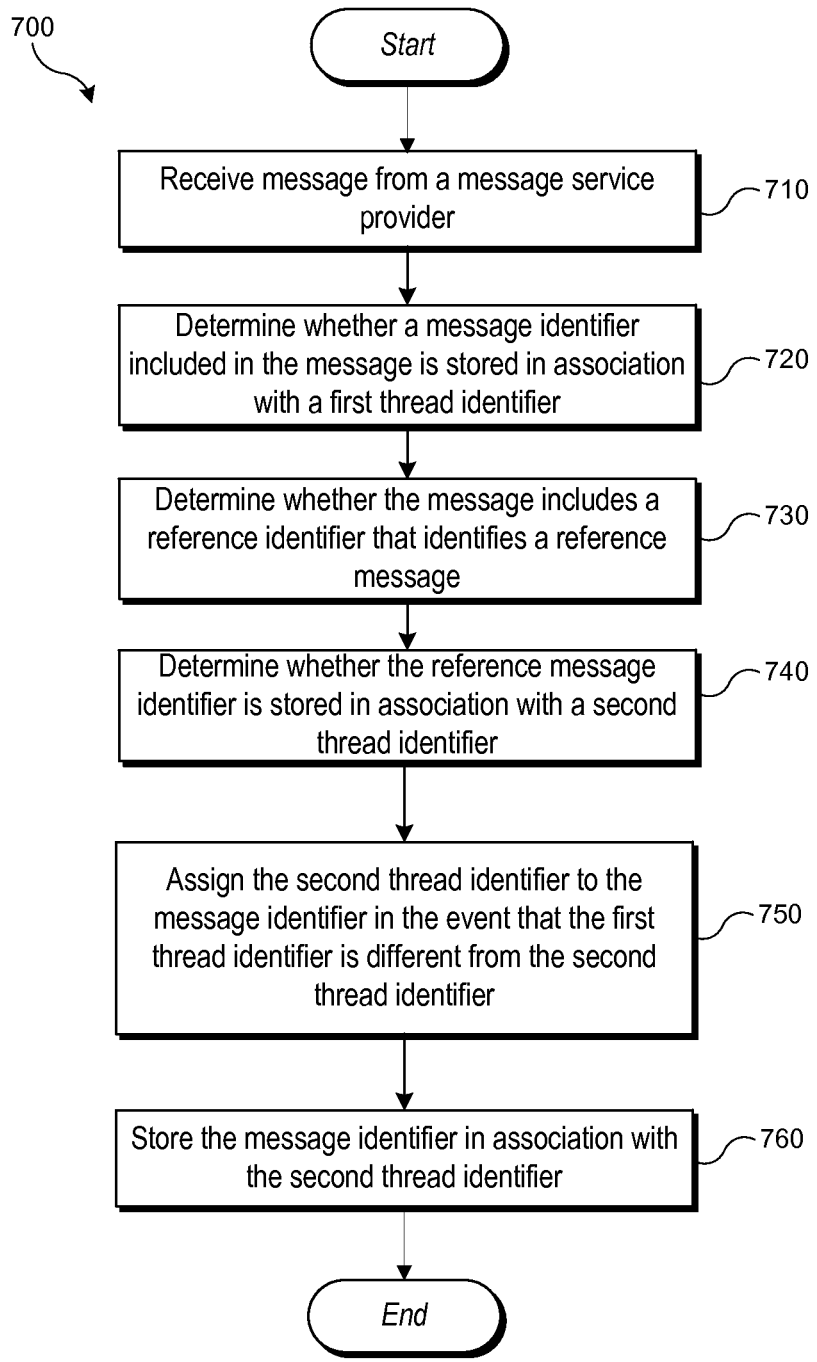
FIG. 7 is a flow diagram of a process for managing message threads according to an embodiment of the present invention.

FIG. 7 is a flow diagram of process 700 for managing message threads according to an embodiment of the present invention. Process 700 can be implemented by message management service 112 of FIG. 1. Process 700 can be implemented by message management service 112 of FIG. 1. In particular, FIG. 7 illustrates a process that message management service 112 can perform to ensure that a message and a reference message are associated with a common thread. For example, in process 700, a message can be associated with a thread of a reference message when the message is not assigned a thread ID. In another example, message can be associated with a thread of a reference message when a thread ID associated with a message ID of the reference message does not match a thread ID associated with a message ID of the message.

At block 710, process 700 can receive a message from a message service provider. For example, message management service 112 can receive one or more messages, such as message stream 204 from one or more message service providers.

At block 720, message management service 112 can determine whether a message ID included in the received message is stored in association with a thread ID in a data store (e.g., data store 230). Locating a message ID stored in association with the thread ID the data store indicates that the received message is identified with a thread.

At block 730, Message management service 112 can inspect the received message to determine whether the received message includes one or more reference message IDs. The reference message ID identifies a reference message of the received message.

At block 740, process 700 determines whether each reference message ID is stored in the data store in association with a thread ID in the data store. Existence of a thread ID associated with a reference message ID indicates that the reference message is identified with a thread.

To ensure that thread information is correctly maintained for consistent threading, the server computer uses the data store to manage association of a thread ID with message IDs of messages and reference messages. In some embodiments, a received message assumes the thread ID of a reference message so that the received message and the reference message are associated with a common thread identified by the thread ID. In such embodiments, at block 750, process 700 assigns a thread ID that is associated with a reference message ID to the message ID. For example, in the event that the message is associated with a thread ID that is different from the thread ID of the reference message ID, the message ID is assigned the thread ID of the reference message ID. In another example, in the event that the message ID is not associated with a thread ID, the message ID is assigned the thread ID associated with the reference message ID. In other words, in these examples, the received message assumes the thread ID of a reference message to ensure that the received message and the reference messages are associated with a common thread.

Figure 8:
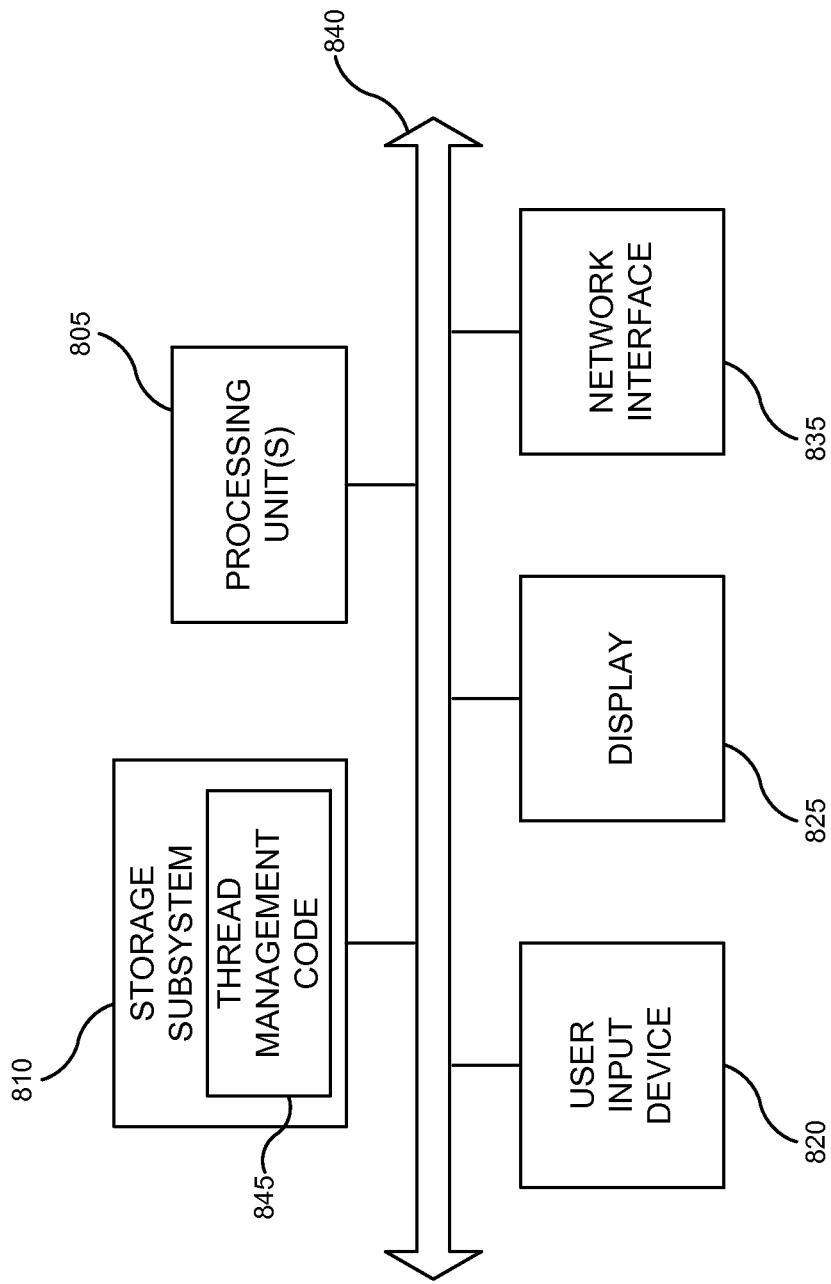
FIG. 8 is a block diagram of a computing system according to some embodiments of the present invention.

FIG. 8 shows a computer system 800 according to an embodiment of the present invention. Computer system 800 can include processing unit(s) 805, storage subsystem 810, input devices 820, display 825, network interfaces implemented in 835, and bus 840. Computer system 800 is a high-level block diagram of a system that can represent a mobile device, a server computer, or any of the computing devices illustrated in FIGS. 1-2 and described herein.

Processing unit(s) 805 can include a single processor, which can have one or more cores, or multiple processors. In some embodiments, processing unit(s) 805 can include a general-purpose primary processor as well as one or more special-purpose co-processors such as graphics processors, digital signal processors, or the like.

Storage subsystem 810 can include various memory units such as a system memory, a read-only memory (ROM), and a persistent storage device. A ROM can store static data and instructions that are used by processing unit(s) 805 and other modules of electronic device 800. A persistent storage device can be a non-volatile readable and writable memory unit that stores instructions and data even when computer system 800 is powered down. System memory can be implemented using volatile read-and-write memory, such as dynamic random access memory, or non-volatile memory as desired. The system memory can store some or all of the instructions and data that are currently in use by processing unit(s) 805.

Storage subsystem 810 or units thereof can be implemented using any combination of computer-readable storage media including semiconductor memory chips of various types (DRAM, SRAM, SDRAM, flash memory, programmable ROM) and so on. Magnetic and/or optical disks can also be used. In some embodiments, storage subsystem 810 can include removable storage media that can be readable and/or writeable; examples of such media include compact discs (CD), read-only digital versatile discs (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer-readable storage media do not include carrier waves and transitory electronic signals passing wirelessly or over wired connections.

In some embodiments, storage subsystem 810 can store one or more software programs to be executed by processing unit(s) 805, such as thread management code 845. For example, thread management code 845 can perform operations or methods described herein as performed by message management service 112 of FIG. 1. "Software" refers generally to sequences of instructions that, when executed by processing unit(s) 805, cause computer system 800 to perform various operations, thus defining one or more specific machine implementations that execute and perform the operations of the software programs. The instructions can be stored as firmware residing in read-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 810, processing unit(s) 805 can retrieve program instructions to execute and data to process in order to execute various operations described herein. Through suitable programming, processing unit(s) 805 can provide various functionality for computer system 800. For example, processing unit(s) 805 can execute thread management code 845.

A user interface can be provided by one or more user input devices 820, display device 825, and/or and one or more other user output devices (not shown). Input devices 820 can include any device via which a user can provide signals to computing system 800; computing system 800 can interpret the signals as indicative of particular user requests or information.

Display 825 can display images generated by computer system 800 and can include various image generation technologies. Some embodiments can include a device such as a touchscreen that functions as both touch-sensitive input device and display device. In some embodiments, other user output devices can be provided in addition to or instead of display 825.

In some embodiments, the user interface can provide a graphical user interface, in which visible image elements in certain areas of display 825 are defined as active elements or control elements that the user selects using user input devices 820. For example, the user can manipulate a user input device to position an on-screen cursor or pointer over the control element, then click a button or tap a touch-sensitive surface to indicate the selection. Alternatively, the user can touch the control element (e.g., with a finger or stylus) on a touchscreen device. Other user interfaces can also be implemented.

Network interface 835 can provide voice and/or data communication capability for computer system 800. In some embodiments, network interface 835 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 835 can provide wired network connectivity (e.g., Ethernet) in addition to or instead of a wireless interface. Network interface 835 can be implemented using a combination of hardware (e.g., antennas, modulators/demodulators, encoders/decoders, and other analog and/or digital signal processing circuits) and software components.

Bus 840 can include various system, peripheral, and chipset buses that communicatively connect the numerous internal devices of computer system 800. For example, bus 840 can communicatively couple processing unit(s) 805 with storage subsystem 810. Storage subsystem 810 can include thread management code 845 that are configured to cause the processing unit(s) 805 to manage threads as described herein. Bus 840 also connects to input devices 820 and display 825. Bus 840 also couples computer system 800 to a network through network interface 835. In this manner, computer system 800 can be a part of a network of multiple computer systems (e.g., a local area network (LAN), a wide area network (WAN), an Intranet, or a network of networks, such as the Internet. Any or all components of computer system 800 can be used in some embodiments of the invention.

Some embodiments include electronic components, such as microprocessors, storage and memory that store computer program instructions in a computer-readable storage medium. Many of the features described in this specification can be implemented as processes that are specified as a set of program instructions encoded on a computer-readable storage medium. When these program instructions are executed by one or more processing units, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter.

It will be appreciated that computer system 800 is illustrative and that variations and modifications are possible. Computer system 800 can have other capabilities not specifically described here. Further, while computer system 800 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

While the invention has been described with respect to specific embodiments, one skilled in the art will recognize that numerous modifications are possible. For example, message IDs and reference message IDs are used for purposes of illustration to describe information in a message that can be used to determine related messages; however, other information included in a message such as a subject, a title, a date, a time, a message body, a signature, or a message attachment can be used, individually or in combination, to identify a relationship between messages (e.g., a thread). A message management service (e.g., message management service 112) can process received messages to identify any or all of the above information that can be used to identify a relationship of messages (e.g., a thread) and store in data store 230 the identified information in association with a thread ID. Data store 230 can be used to stored information included in messages to identify a thread of messages that are related by identical or related information. A thread ID can be stored in association with related messages to identify messages that belong to a common thread.

Identified message threads can be useful for any service or client that desires to manage activity and actions with respect to messages. In some embodiments, information about message threads can be provided to message providers, which can use information about the message threads to manage threads of messages. Message providers can reduce storage and improve efficiency for managing relationships of emails by using the information about message threads provided by a message management service. Clients, which can be limited by computing resources, can improve efficiency of operation by managing threads of messages based receiving thread information from a message management service as described herein that has computing resources to process large amount of emails. In some embodiments, clients can be provided with thread information included in messages that are communicated from a message provider to the clients via a message management service. For example, a message management service can insert thread information into a header of messages that are communicated via the message management service. Alternatively or additionally, one or more of the thread management processes described herein can be implemented at a client or a message provider. In some embodiments, an amount of storage to store thread information, such as thread map, may not cause a significant use of computing resources.

Embodiments described above may make reference to data structures and databases or data stores. It is to be understood that these terms can encompass any techniques for organizing information into discrete records that can be stored, retrieved and interpreted by computer systems.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
    receiving, by a processor, a message;
    determining, by the processor, based upon thread information stored in a data store, whether a message identifier included in the message is associated with a first thread;
    determining, by the processor, whether the message includes a reference message identifier;
    determining, by the processor, based upon the thread information, whether the reference message identifier included in the message is associated with a second thread;
    determining, by the processor, based on the thread information, whether the first thread that is associated with the message identifier in the message is different from the second thread that is associated with the reference message identifier in the message;
    upon determining that the first thread is different from the second thread, updating, by the processor, the thread information to associate both the message identifier of the message and the reference message identifier of the message with a third thread, wherein the third thread is different from the first thread and the second thread;
    determining, by the processor, based on the thread information, that the first thread is associated with a first set of related message identifiers, wherein each related message identifier of the first set of related message identifiers is distinct from the message identifier that is associated with the first thread and is distinct from the reference message identifier that is associated with the second thread; and
    updating, by the processor, the thread information to change an association of each of the first set of related message identifiers with the first thread to an association with the third thread.

2. The method of claim 1 wherein a reference message identified by the reference message identifier is a parent of the message or a predecessor of the message.

3. The method of claim 1 wherein the message is an email message.

4. The method of claim 1 wherein the message is received during a first time period, wherein a reference message identified by the reference message identifier is received during a second time period, and wherein the first time period is prior to the second time period.

5. The method of claim 1 further comprising:
    updating, by the processor, the thread information to associate the message identifier with a new thread in response to determining that the message does not include the reference message identifier and in response to determining that the message identifier is not associated with the first thread.

6. The method of claim 1 further comprising:
    updating, by the processor, the thread information to associate both the message identifier and the reference message identifier with a new thread in response to determining that the message identifier is not associated with the first thread and in response to determining that the reference message identifier is not associated with the second thread.

7. The method of claim 1 further comprising:
    updating, by the processor, the thread information to associate the message identifier with the second thread in response to determining that the message identifier is not associated with the first thread and in response to determining that the reference message identifier is associated with the second thread.

8. The method of claim 1 further comprising:
    updating, by the processor, the thread information to associate the reference message identifier with the first thread in response to determining that the message identifier is associated with the first thread and in response to determining that the reference message identifier is not associated with the second thread.

9. The method of claim 1 further comprising:
    updating, by the processor, the thread information to change an association of the message identifier with the first thread to an association with the second thread in response to determining that the reference message identifier is associated with the second thread and in response to determining that the first thread is different from the second thread.

10. The method of claim 1 wherein the third thread is a new thread that is different from the first thread and the second thread.

11. The method of claim 1 further comprising:
    determining, by the processor, based on the thread information, that the second thread is associated with a second set of related message identifiers, wherein each related message identifier of the second set of related message identifiers is distinct from the message identifier that is associated with the first thread and is distinct from the reference message identifier that is associated with the second thread; and
    updating, by the processor, the thread information to change an association of each message identifier of the second set of related message identifiers with the second thread to an association with the third thread.

12. A server system comprising:
    one or more processors; and
    one or more memory devices including instructions configured to cause the one or more processors to perform a method comprising:
        receiving a message;
        determining, based upon thread information stored in a data store, whether a message identifier included in the message is associated with a first thread;
        determining whether the message includes a plurality of reference message identifiers, wherein each of the plurality of reference message identifiers is a predecessor reference message identifier that identifies a predecessor message of the message;

determining, based upon the thread information, whether a reference message identifier of the plurality of reference message identifiers included in the message is associated with a second thread;

determining, based on the thread information, whether the first thread that is associated with the message identifier in the message is different from the second thread that is associated with the reference message identifier;

upon determining that the first thread is different from the second thread, updating the thread information to associate both the message identifier of the message and the reference message identifier of the message with a third thread, wherein the third thread is different from the first thread and the second thread;

determining, based on the thread information, that the first thread is associated with a first set of related message identifiers, wherein each related message identifier of the first set of related message identifiers is distinct from the message identifier that is associated with the first thread and is distinct from the reference message identifier that is associated with the second thread; and updating the thread information to change an association of each of the first set of related message identifiers with the first thread to an association with the third thread.

13. The server system of claim 12 wherein the plurality of reference message identifiers includes a parent message identifier, wherein the parent message identifier identifies a parent message of the message, and wherein the parent message identifier is associated with the second thread.

14. The server system of claim 12 wherein the plurality of reference message identifiers includes a parent message identifier and a predecessor message identifier, wherein the parent message identifier identifies a parent message of the message, wherein the predecessor message identifier identifies a predecessor message of the message, and wherein the predecessor message identifier is associated with the second thread.

15. The server system of claim 14 wherein the method further comprises:

determining whether the parent message identifier is associated with a fourth thread; and updating the thread information to associate the parent message identifier with the third thread in response to determining that the parent message identifier is associated with the fourth thread.

16. The server system of claim 12 wherein the method further comprises:

updating the thread information to associate each of the plurality of reference message identifiers with the first thread in response to determining that the message identifier is stored in association with the first thread and in response to determining that none of the plurality of reference message identifiers are stored in association with the second thread.

17. The server system of claim 12 wherein the third thread is a new thread that is different from the first thread and the second thread.

18. The server system of claim 12 wherein the method further comprises:

determining, based on the thread information, that the second thread is associated with a second set of related message identifiers, wherein each related message identifier of the second set of related message identifiers is distinct from the message identifier that is associated with the first thread and is distinct from the reference message identifier that is associated with the second thread; and updating the thread information to change an association of each message identifier of the second set of related message identifiers with the second thread to an association with the third thread.

19. A non-transitory computer-readable storage medium having stored thereon executable instructions that, when executed by one or more processors of a computer system, cause the computer system to execute a method comprising:

receiving a message;

determining, based upon thread information stored in a data store, whether a message identifier included in the message is associated with a first thread;

determining whether the message includes a reference message identifier, wherein the reference message identifier identifies a parent message of the message;

determining, based upon the thread information, whether the reference message identifier included in the message is associated with a second thread;

determining, based on the thread information, whether the first thread that is associated with the message identifier in the message is different from the second thread that is associated with the reference message identifier in the message;

upon determining that the first thread is different from the second thread, updating the thread information to associate both the message identifier of the message and the reference message identifier of the message with a third thread, wherein the third thread is different from the first thread and the second thread;

determining, based on the thread information, that the first thread is associated with a first set of related message identifiers, wherein each related message identifier of the first set of related message identifiers is distinct from the message identifier that is associated with the first thread and is distinct from the reference message identifier that is associated with the second thread; and updating the thread information to change an association of each of the first set of related message identifiers with the first thread to an association with the third thread.

20. The non-transitory computer readable storage medium of claim 19 wherein the method further comprises:

determining, based on the thread information, one or more message identifiers associated with the first thread; and updating the thread information to change an association of the one or more message identifiers with the first thread to an association with the second thread.

* * * * *